United States Patent Office 3,280,143
Patented Oct. 18, 1966

3,280,143
IMIDES OF POLYHALOPOLYHYDROMETHANO-
NAPHTHALENEDICARBOXYLIC ACIDS
Charles M. Hayes, Hoffman Estates, Ill., assignor to Universal Oil Products Company, Des Plaines, Ill., a corporation of Delaware
No Drawing. Filed Dec. 12, 1963, Ser. No. 329,950
8 Claims. (Cl. 260—326)

This invention relates to novel compositions of matter comprising the condensation products of a particular type of a halo substituted polyhydropolycyclicdicarboxylic acid or anhydride thereof and an amine compound. More particularly the invention is concerned with novel compositions of matter resulting from the condensation of a polychloro substituted polyhydromethanonaphthalenedicarboxylic acid or anhydride thereof and a primary amine compound.

It has now been discovered that certain halo substituted polyhydroalkanonaphthalenedicarboxylic acid or anhydrides thereof may be condensed with certain amine compounds and, as hereinbefore set forth, particularly primary amine compounds, of a type hereinafter set forth in greater detail to form reaction products which will find many and varied uses in the chemical field. For example, the reaction product between an acid or anhydride of the type hereinafter set forth in greater detail and a primary amine compound, said product being referred to in the present specification and appended claims as an imide of a polyhalopolyhydromethanonaphthalenedicarboxylic acid, may be used as one of the materials in an interfacial polymerization process which is useful in imparting shrink-proofing properties to fibrous materials and particularly to wool. The interfacial polymerization process is effected by treating the fibrous material with an imide of a polyhalopolyhydromethanonaphthalenedicarboxylic acid and thereafter further treating the fibrous material with a polyacid polyhalide containing at least two acid halide group per molecule, both the imide and polyacid polyhalide being in solutions which are mutually immiscible with one another. The formation of the polymer on the fibrous material and particularly wool will impart a shrink-proofing property to the material as well as many other desirable physical characteristics including smoothness after drying, excellent hand, increased break strength and tear strength as well as improved resistance to abrasion, chemicals and pilling. The use of the imides in the present invention as one of the reactants in forming the polymer is advantageous inasmuch as the fibrous material, and particularly wool, after treatment thereof will not have the desirable characteristics of the fibrous material altered nor will a post-cure of the material be necessary. Due to the particular configuration of the imide of the polyhalopolyhydromethanonaphthalenedicarboxylic acid, the fibrous material will also possess anti-bacterial, anti-fungal and insecticidal properties.

It has also been discovered that the products of the present invention which comprises imides of polyhalopolyhydromethanonaphthalenedicarboxylic acids are particularly useful as additives to certain polymeric compositions of matter and particularly resins. The imides of the present invention when added to these resins and specifically resins which are referred to as epoxy resins will act as curing agents therefor and impart useful properties to the cured resins. For example, an epoxy resin which has been cured by the addition of an imide prepared according to the process hereinafter described in greater detail will be fire resistant or retardant, the resin being self-extinguishing when removed from the direct action of a flame. This property being fire resistant will be especially useful when preparing articles of commerce which are to be used in places which may be subject to excessive heat or the action of a flame.

It is therefore an object of this invention to prepare novel compositions of matter which find a wide variety of use in the chemical industry.

A further object of this invention is to provide a process for preparing novel compositions of matter comprising imides of polyhalopolyhydromethanonaphthalenedicarboxylic acids.

Yet another object of this invention is to provide a process for curing certain resins utilizing the novel compositions of matter of the present invention to impart certain desirable physical characteristics to said resins.

One embodiment of this invention resides in an imide of the followng general formula:

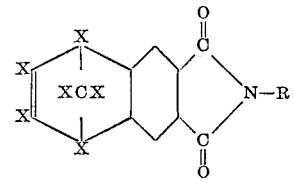

in which R is selected from the group consisting of hydrogen, alkyl and aminoalkyl of from 1 to 20 carbon atoms, polyalkenepolyamino, aryl, aminoaryl, polyarylenepolyamino of from 1 to 3 carbocyclic rings and aminocycloalkyl and polycycloalkenepolyamino having from 4 to 8 carbon atoms in the ring, and X is selected from the group consisting of hydrogen and halogen radicals, at least two X's being halogen.

Another embodiment of this invention is found in a process for the preparation of an imide of a polyhalopolyhydromethanonaphthalenedicarboxylic acid which comprises condensing a compound selected from the group consisting of polyhalopolyhydromethanonaphthalenedicarboxylic acids and anhydrides thereof with an amine compound having the generic formula: $H_2N{-}R$, in which R is selected from the group consisting of hydrogen, allyl, cycloalkyl, aryl, alkylamine, alkylenepolyamine, polyalkylenepolyamine, arylamine, arylenepolyamine, polyarylenepolyamine, cycloalkylamine, cycloalkylenepolyamine, and polycycloalkylenepolyamine radicals at an elevated temperature, and recovering the desired imide.

Yet another embodiment of this invention is found in a process for the treatment of resinous materials which comprises admixing a resinous material with an imide of a polyhalopolyhydromethanonaphthalenedicarboxylic acid at an elevated temperature, curing the resultant mixture at an elevated temperature, and recovering the treated resinous material.

A specific embodiment of this invention is found in the diethylenediamino imide of 5,6,7,8,9,9-hexachloro-1,2,3,4,5,5a,8,8a - octahydro - 5,8-methano-2,3-naphthalenedicarboxylic acid.

Another specific embodiment of this invention resides in a process for the preparation of the diphenyldiamino imide of 5,6,7,8,9,9-hexachloro-1,2,3,4,5,5a,8,8a-octahydro-5,8-methano-2,3-naphthalenedicarboxylic acid which comprises condensing diaminodiphenylamine with 5,6,7,8,9,9-hexachloro - 1,2,3,4,5,5a,8,8a - octahydro-5,8-methano-2,3- naphthalenedicarboxylic anhydride in benzene at a temperature in the range of from about 80° to about 90° C., and recovering the desired diphenyldiamino imide of 5,6,7,8,9,9 - hexachloro - 1,2,3,4,5,5a,8,8a-octahydro-5,8-methano-2,3-naphthalenedicarboxylic acid.

Another specific embodiment of this invention is found in a process for the treatment of an epoxy resin which comprises admixing said epoxy resin with the diethylenediamino imide of 5,6,7,8,9,9-hexachloro-1,2,3,4,5,5a,8,8a-octahydro-5,8-methano-2,3-naphthalenedicarboxylic acid at a temperature in the range of from about 50° C. to about 150° C., curing the resultant mixture at a temperature in the range of from about 100° to about 150° C., and recovering the treated epoxy resin.

Other objects and embodiments will be found in the following further detailed description of this invention.

As hereinbefore set forth, the present invention relates to novel compositions of matter comprising the imides of polyhalopolyhydromethanonaphthalenedicarboxylic acids and to a method for the preparation thereof. In addition, the present invention is also concerned with the use of these compounds as additives for resins and particularly as curing agents for epoxy resins.

The polyhalopolyhydromethanonaphthalenedicarboxylic acids or anhydrides thereof which comprise one of the starting materials utilized in the present invention may be prepared in any suitable manner such as the Diels-Alder reaction of a conjugated aliphatic diene with an olefinic dicarboxylic acid or anhydride. Examples of conjugated aliphatic dienes which may be used include 1,3-butadiene, 2-methyl-1,3-pentadiene, 1,3-pentadiene, etc.; olefinic dicarboxylic acids or anhydrides which may be used include maleic acid, maleic anhydride, fumaric acid, etc. The Diels-Alder condensation will take place at an elevated temperature in the range of from about 80° to about 250° C. or more and at a pressure sufficient to maintain a major portion of the reactants in a liquid phase, said pressure being in a range of from about atmospheric to about 100 atmospheres or more. The tetrahydrophthalic acid or anhydride thereof which results from the aforementioned condensation is then further condensed with a conjugated halo cycloalkadiene to form the desired product, examples of said halo substituted cycloalkadiene including tetrachlorocyclopentadiene, hexachlorocyclopentadiene, tetrabromocyclohexadiene, hexabromocyclopentadiene, etc. The second condensation reaction is also effected at elevated temperatures in a range of from about 50° C. to about 250° C. or more and at pressures ranging from atmospheric up to about 100 atmospheres or more, the pressure again being sufficient so as to maintain a major portion of the reactants in the liquid phase at the reaction temperature.

Examples of polyhalopolyhydromethanonaphthalenedicarboxylic acids or anhydrides thereof which may be utilized as a starting material in the present process include:

5,6,7,8,9,9 - hexachloro - 1,2,3,4,5,5a,8,8a - octahydro-5,8-methano-2,3-naphthalenedicarboxylic acid,
5,6,7,8,9,9 - hexachloro - 1,2,3,4,5,5a,8,8a - octahydro-5,8-methano-2,3-naphthalenedicarboxylic anhydride,
5,6,7,8,9,9 - hexabromo - 1,2,3,4,5,5a,8,8a - octahydro-5,8-methano-2,3-naphthalenedicarboxylic acid,
5,6,7,8,9,9 - hexabromo - 1,2,3,4,5,5a,8,8a - octahydro-5,8-methano-2,3-naphthalenedicarboxylic anhydride, etc.

Examples of amine compounds which may be utilized in the process of the present invention as the other starting materials to thus form the novel compositions of matter will possess the generic formula:

in which R is selected from the group consisting of hydrogen, alkyl and aminoalkyl of from 1 to 20 carbon atoms, polyalkenepolyamino, aryl, aminoaryl, polyarylenepolyamino of from 1 to 3 carbocyclic rings and aminocycloalkyl and polycycloalkenepolyamino having from 4 to 8 carbon atoms in the ring. Specific examples of these compounds which must contain at least one primary nitrogen atom include alkylmonoamines such as methylamine, ethylamine, propylamine, butylamine, the isomeric pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl amines, etc.; amines prepared from fatty acid derivatives such as tallow amine, hydrogenated tallow amine, lauryl amine, stearyl amine, oleyl amine, linoleyl amine, etc.; alkylene polyamines such as ethylenediamine, propylenediamine (diamino propane), butylenediamine, pentylenediamine, hexylenediamine, etc., N-alkyl substituted diamino alkanes such as N-methyl-diaminoethane, N-ethyl-diaminoethane, N-methyl-1,3-diaminopropane, N-ethyl-1,3-diaminopropane, other N-alkyl-1,3-diaminopropanes in which the alkyl group may contain carbon atoms ranging from 2 up to about 20 carbon atoms and thus the alkyl group is selected from hexyl, heptyl, octyl, nonadecyl, undecyl, dodecyl, tridecyl, tetradecyl, etc. radicals. In addition, other N-alkyl diaminoalkanes such as the N-alkyl-1,4-diaminobutanes, N-alkyl-1,2-diaminopentanes, N-alkyl-1,5-diaminopentanes, N-alkyl-1,2-diaminohexanes, N-alkyl-1,3-diaminohexanes, N-alkyl-1,6-diaminohexanes, etc. may also be used.

Other amine compounds which may be used include polyalkylenepolyamines and N substituted derivatives thereof including diethylenetriamine, dipropylenetriamine, dibutylenetriamine, dipentylenetriamine, dihexylenetriamine, diheptylenetriamine, dioctylenetriamine, etc., triethylenetetramine, tripropylenetetramine, tributylenetetramine, tripentylenetetramine, trihexylenetetramine, triheptylenetetramine, trioctylenetetramine, etc., tetraethylenepenamine, tetrapropylenepentamine, tetrapentylenepentamine, tetrahexylenepentamine, tetraheptylenepentamine, etc., pentaethylenehexamine, pentapropylenehexamine, pentabutylenehexamine, pentapentylenehexamine, etc.

It is also contemplated within the scope of this invention that N-alkyl-1,3-diaminopropanes in which the alkyl group contains from about 8 to about 25 carbon atoms of which a number of the class are commercially available may also be utilized although not necessarily with equivalent results. For example, certain amine compounds known as "Duomeen T" and "Diam 26" in which the alkyl group is derived from tallow and contains from about 12 to about 20 carbon atoms per group and mostly 16 to 18 carbon atoms per group may be utilized as the amine starting material in the present invention.

Aromatic amines which may be used include monoamines such as aniline, the toluidines, the xylidines, naphthylamine, anthracylamine, etc.; aromatic polyamines such as o-phenylenediamine, m-phenylenediamine, p-phenylenediamine, 1,2-naphthalenediamine, 1,4-naphthalenediamine, 1,5-naphthalenediamine, 1,6-naphthalenediamine, 1,7-naphthalenediamine, 1,8-naphthalenediamine, 2,3-naphthalenediamine, 2,6-naphthalenediamine, 2,7-naphthalenediamine, 1,2,3-triaminobenzene, 1,2,4-triaminobenzene, 1,3,5-triaminobenzene, etc., polyarylenepolyamines such as diaminodiphenylamine, diaminodinaphthylamine, aminodinaphthylamine, etc.; cycloalkylamines such as cyclobutylamine, cyclopentylamine, cyclohexylamine, cycloheptylamine, cyclooctylamine, 2-methylcyclobutylamine, 3-methylcyclobutylamine, 3-methylcyclopentylamine, 2-methylcyclohexylamine, 4-methylcyclohexylamine, etc., cycloalkyleneamines such as the isomeric cyclobutyldiamines, cyclopentyldiamines, cyclohexyldiamines, cycloheptyldiamines, cyclooctyldiamines, etc., polyalkylenepolycycloalkylenepolyamines such as diaminodicyclobutylamine, diaminodicyclopentylamine, diaminodicyclohexylamine, the tricycloalkyltetramines, the tetracycloalkylpentamines, etc.

It is to be understood that the aforementioned amine compounds are only representatives of the class of compounds falling within the generic formula hereinbefore set forth, and that the present invention is not necessarily limited thereto.

The desired novel compositions of matter of the present invention may be prepared by condensing a polyhalopolyhydromethanonaphthalenedicarboxylic acid or anhydride thereof of the type hereinbefore set forth in greater detail with an amine compound containing at least one primary nitrogen atom at condensation conditions and preferably in the presence of a substantially inert organic solvent including aromatic hydrocarbons such as benzene, toluene, xylene, ethylbenzene, etc.; aliphatic hydrocarbons such as n-pentane, n-hexane, n-heptane, etc., or cyclic paraffins such as cyclopentane, cyclohexane, methylcyclopentane, etc. The reaction is preferably effected at elevated temperatures in the range of from about 50° to about 250° C. or more, the particular reaction temperatures being dependent upon the solvent which is utilized in the reaction, the reaction usually being effected at the reflux temperature of the solvent. In addition, the reaction time will be dependent to some extent upon the particular temperature which is employed and will usually range from about one-half up to about 5 hours or more.

The process in which the novel compositions of matter of the present invention are prepared may be effected in any suitable manner and may comprise either a batch or continuous type operation. When a batch type operation is used, an amine compound of the type hereinbefore set forth in greater detail is placed in an appropriate reaction vessel along with, if so desired, a substantially inert organic solvent such as benzene, toluene, etc. The polyhalopolyhydromethanonaphthalenedicarboxylic acid or anhydride thereof is slowly added thereto, the reaction usually being exothermic. To control this exothermicity, the amine compound may be cooled prior to the addition of the acid or anhydride and the rise in temperature controlled by utilization of any external cooling means such as an ice bath. Upon completion of the addition of the acid or anhydride the reaction mixture is heated to the reflux temperature of the solvent, if one is used, or to a predetermined reaction temperature which may be in the range of from about 100 up to about 250° C. or more. The reaction vessel which is utilized for the process of the invention is provided with means for removing the water which is formed during the reaction. Upon completion of the desired residence time which, as hereinbefore set forth, may range from about one-half up to about 5 hours or more, which is evidenced by the removal of the theoretical amount of water, the reaction mixture is allowed to cool to room temperature. Following this the solvent may be removed by distillation followed by removal of the excess amine compound. In this respect it should be noted that the amine compound is usually present in the original reaction mixture in a ratio of from about 1.5 to about 10 moles of amine per mole of acid or anhydride.

The reaction product is recovered and purified by conventional means such as washing with water, dissolving in alcohol and drying. The purified product is then recovered.

It is also contemplated within the scope of this invention that the novel compositions of matter may be prepared in a continuous manner of operation, although not necessarily with equivalent results. When such a method is used, the quantity of the starting materials comprising the polyhalopolyhydromethanonaphthalenedicarboxylic acid or anhydride thereof and an excess of the amine compound along with an organic solvent are continuously charged to a reaction vessel which is maintained at the proper operating conditions of temperature or pressure. Upon completion of the desired residence time in the reaction vessel, the reactor effluent is continuously removed. The unreacted starting materials are separated from the effluent and recycled to form a portion of the feed stock. The remainder of the effluent is then further subjected to fractional distillation to remove the solvent and water and thereafter purified and recovered by conventional means.

The novel compositions of matter which are prepared according to the process of this invention possess the generic formula:

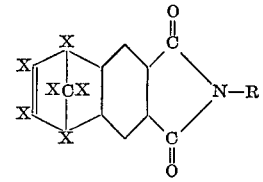

in which R is selected from the group consisting of hydrogen, alkyl, cycloalkyl, aryl, alkylamine, alkylenepolyamine, polyalkylenepolyamine, arylamine, arylenepolyamine, polyarylenepolyamine, cycloalkylamine, cycloalkylenepolyamine and polycycloalkylenepolyamine radicals, and X is selected from the group consisting of hydrogen and halogen radicals, at least two X's being halogen, the preferred halogen atoms being chlorine and bromine.

Some specific examples of these compounds include
the diethylenediamino imide of 5,6,7,8,9,9-hexachloro-1,2,3,4,5,5a,8,8a-octahydro-5,8-methano-2,3-naphthalenedicarboxylic acid,
the dipropylenediamino imide of 5,6,7,8,9,9-hexacholoro-1,2,3,4,5,5a,8,8a-octahydro-5,8-methano-2,3-naphthalenedicarboxylic acid,
the dibutylenediamino imide of 5,6,7,8,9,9-hexachloro-1,2,3,4,5,5a,8,8a-octahydro-5,8-methano-2,3-naphthalenedicarboxylic acid,
the ethyleneamino imide of 5,6,7,8,9,9-hexachloro-1,2,3,4,5,5a,8,8a-octahydro-5,8-methano-2,3-naphthalenedicarboxylic acid,
the propylene amino imide of 5,6,7,8,9,9-hexachloro-1,2,3,4,5,5a,8,8a-octahydro-5,8-methano-2,3-naphthalenedicarboxylic acid,
the diethyldiethylenediamino imide of 5,6,7,8,9,9-hexachloro-1,2,3,4,5,5a,8,8a-octahydro-5,8-methano-2,3-naphthalenedicarboxylic acid,
the di-n-propyldiethylenediamino imide of 5,6,7,8,9,9-hexachloro-1,2,3,4,5,5a,8,8a-octahydro-5,8-methano-2,3-naphthalenedicarboxylic acid,
the di-sec-butyldiethylenediamino imide of 5,6,7,8,9,9-hexachloro-1,2,3,4,5,5a,8,8a-octahydro-5,8-methano-2,3-naphthalenedicarboxylic acid,
the phenyleneamino imide of 5,6,7,8,9,9-hexachloro-1,2,3,4,5,5a,8,8a-octahydro-5,8-methano-2,3-naphthalenedicarboxylic acid,
the diphenyldiamino imide of 5,6,7,8,9,9-hexachloro-1,2,3,4,5,5a,8,8a-octahydro-5,8-methano-2,3-naphthalenedicarboxylic acid,
the cyclohexyleneamino imide of 5,6,7,8,9,9-hexachloro-1,2,3,4,5,5a,8,8a-octahydro-5,8-methano-2,3-naphthalenedicarboxylic acid,
the cyclopentyleneamino imide of 5,6,7,8,9,9-hexachloro-1,2,3,4,5,5a,8,8a-octahydro-5,8-methano-2,3-naphthalenedicarboxylic acid,
the diaminocyclohexylene imide of 5,6,7,8,9,9-hexachloro-1,2,3,4,5,5a,8,8a-octahydro-5,8-methano-2,3-naphthalenedicarboxylic acid,
the dicyclohexylenediamino imide of 5,6,7,8,9,9-hexachloro-1,2,3,4,5,5a,8,8a-octahydro-5,8-methano-2,3-naphthalenedicarboxylic acid, etc.,
the corresponding N-alkylated imides of 5,6,7,8,9,9-hexachloro-1,2,3,4,5,5a,8,8a-octahydro-5,8-methano-2,3-naphthalenedicarboxylic acid, etc.,
the corresponding imides of 5,6,7,8,9,9-hexabromo-1,2,3,4,5,5a,8,8a-octahydro-5,8-methano-2,3-naphthalenedicarboxylic acid, etc.

It is to be understood that the aforementioned compounds are only representatives of the class of compounds which may be prepared and that the present invention is not necessarily limited thereto.

As hereinbefore set forth, it has now been discovered that the novel compositions of matter prepared according to the process just described may be utilized as additives for certain polymeric compositions of matter and particularly resinous material. Particularly speaking, the products of this invention may be used as additives with epoxy resins whereby the final product will posses advantageous physical properties, one of which is a high degree of flame retardancy. The epoxy resins in an uncured state are usually thermoplastic and may range from low viscosity liquids to high metal point brittle solids. One example of an epoxy resin which may be cured by the addition of the imides of the present invention is the condensation product of epichlorhydrin and bisphenol-A. The resins may be cured by admixing an imide of an acid of the type hereinbefore set forth with the resin and thereafter curing the mixture by treatment at an elevated temperature for a predetermined period of time. The resultant product will have the physical characteristics thereof altered to their desirable values and thus may be utilized for various purposes such as floor surfacing, coatings, etc. Among these desirable characteristics is the excellent fire retardancy as well as the color stability of the finished product. It is also contemplated within the scope of this invention that other compounds which possess fire retardant properties such as the antimony and phosphorous compounds may also be added to the mixture during the curing of the resin.

The following examples are given to illustrate the process of the present invention which, however, are not intended to limit the generally broad scope of the present invention in strict accordance therewith.

*Example I*

One method of preparing the novel compositions of matter of the present invention is shown by the following example in which 258 grams (2.5 mole) of diethylenetriamine was placed in a reaction vessel provided with a water trap. During a period of one hour 213 grams (0.5 mole) of 5,6,7,8,9,9-hexachloro-1,2,3,4,5,5a,8,8a-octahydro-5,8-methano-2,3-naphthalenedicarboxylic anhydride was gradually added thereto. Following this, 200 cc. of benzene was added, the reaction mixture was heated and maintained at reflux temperature (about 85° C.) for a period of about 1.5 hours. During this time approximately 9 cc. of water was removed during the refluxing. The benzene was then removed by distillation on a steam bath and the excess diethylenetriamine was removed by distillation under high vacuum. After removal of the solvent and excess amine the reaction mixture was a yellow-orange brittle solid having a basic nitrogen equivalent weight of 220 grams. The product was ground to a fine powder, washed several times with water, dissolved in methyl alcohol and dried using anhydrous sodium sulfate. The mixture was then filtered and the methyl alcohol was evaporated. This left a red viscous clear liquid which crystallized to a red solid upon standing. The product had a basic nitrogen equivalent weight of 262 grams which corresponds to a theoretical nitrogen equivalent of 255 for the equal mole reaction product comprising the diethylenediamino amide of 5,6,7,8,9,9-hexachloro - 1,2,3,4,5,5a,8,8a - octahydro - 5,8 - methano-2,3-naphthalenedicarboxylic acid which may also be designated as N-(aminoethylaminoethyl)-5,6,7,8,9,9-hexachloro - 1,2,3,4,5,5a,8,8a - octahydro - 5,8 - methano-2,3-naphthalenedicarboxylic acid imide.

*Example II*

To illustrate another method of obtaining the novel compositions of matter of the present invention, 206 grams (2.0 mole) of diethylenetriamine was charged to a reaction flask provided with a Dean-Stark adapter stirring and heating means. The flask was immersed in an ice bath until the temperature of the diethylenetriamine was lowered to about 3° C. Following this 85 grams (0.2 mole) of 5,6,7,8,9,9-hexachloro-1,2,3,4,5,5a,8,8a-octahydro-5,8-methano-2,3-naphthalenedicarboxylic anhydride was slowly added during a period of 15 minutes. The immediate reaction upon the addition of the anhydride was exothermic, the well temperature reaching 15° C. The reaction mixture was then allowed to warm to room temperature and thereafter heated for three hours at a temperature of about 180° C. At room temperature the reaction mixture was an amber viscous slurry containing undissolved anhydride. During the heating period all of the anhydride dissolved forming a dark solution. The reaction was considered complete when 4 cc. of water had been collected in the adapter. The solution was then allowed to cool to room temperature and the desired product comprising the diethylenediamino imide of 5,6,7,8,9,9-hexachloro-1,2,3,4,5,5a,8,8a-octahydro-5,8-methano-2,3-naphthalenedicarboxylic acid was recovered.

*Example III*

In this example 38 grams (0.2 mole) of tetraethylenepentamine and 100 cc. of benzene was placed in a reaction flask of a similar nature to those hereinabove described. The reaction mixture was heated to reflux temperature (about 83° C.) and maintained thereat for a period of about 4 hours. During this time all of the theoretical water was recovered in the adapter. The flask and contents thereof were allowed to cool to room temperature, the benzene removed and the excess tetraethylenepentamine was removed, and there was recovered the desired product comprising the tetraethylenetetramino imide of 5,6,7,8,9,9-hexachloro-1,2,3,4,5,5a,8,8a-octahydro-5,8-methano-2,3-naphthalenedicarboxylic acid which may also be designated as (N-aminoethylaminoethylaminoethylaminoethyl) - 5,6,7,8,9,9 - hexachloro - 1,2,3,4,5,-5a,8,8a - octahydro - 5,8 - methano - 2,3 - naphthalenedicarboxylic acid imide.

The above experiment was repeated using 189 grams (1.0 mole) of tetraethylenepentamine and 42 grams of the anhydride. However, in this experiment the amine compound and anhydride were reacted in the absence of any solvent, the reaction being effected by heating the mixture to a temperature of about 200° C. for a period of about 2 hours. At the end of this time the flask and contents thereof were cooled to room temperature, excess tetraethylenepentamine was removed by distillation and the product recovered.

*Example IV*

In this example 60 grams (1.0 mole) of ethylenediamine are placed in a reaction vessel which is thereafter cooled to a temperature of about 3° C. by immersing the flask in an ice bath. To the cooled mixture is added 42.6 grams (0.1 mole) of 5,6,7,8,9,9-hexachloro-1,2,3,4,5,5a, 8,8a - octahydro-5,8-methano-2,3-naphthalenedicarboxylic anhydride during a period of about 15 minutes. The temperature of the flask will rise due to the exothermicity of the reaction and upon completion of the addition of the anhydride the flask and contents thereof are allowed to warm to room temperature. Following this 100 cc. of benzene are added and the flask and contents thereof are then heated to a temperature of about 85° C. and maintained thereat for a period of about 4 hours, the reaction being completed when the theoretical amount of water which is formed during the reaction is recovered in the water trap. At the end of this time the flask and contents thereof are allowed to cool to room temperature. The solvent is removed by distillation on a steam bath and the excess amine is removed by distillation under high vacuum. The desired product is recovered and comprises the ethyleneamino imide of 5,6,7,8,9,9-hexachloro-1,2,3,4,5, 5a,8,8a - octahydro - 5,8 - methano-2,3-naphthalenedicarboxylic acid which may also be designated as N-(aminoethyl) - 5,6,7,8,9,9 - hexachloro - 1,2,3,4,5,5a,8,8a-octahydro-5,8-methano-2,3-naphthalenedicarboxylic acid imide.

Example V

In this example 200 grams (1.0 mole) of diaminodiphenylamine is dissolved in toluene and the mixture is placed in a reaction flask which is thereafter maintained at room temperature by external means. Eighty-five grams (0.2 mole) of 5,6,7,8,9,9-hexachloro-1,2,3,4,5,5a,8,8a - octahydro - 5,8-methano-2,3-naphthalenedicarboxylic anhydride is slowly added to the mixture during a period of about 15 minutes. Upon completion of the addition which is accompanied by a rise in temperature due to the exothermic nature of the reaction, the flask meanwhile being maintained at approximately room temperature, the reaction mixture is heated to the reflux temperature (about 115° C.) and maintained thereat for a period of about 4 hours during which time the theoretical amount of water formed during the reaction is collected in a water trap. Upon completion of the reaction, the flask and contents thereof are allowed to cool to room temperature, the toluene is removed by distillation as is the excess diaminodiphenylamine and the desired product comprising the diphenyldiamino imide of 5,6,7,8,9,9-hexachloro-1,2,3,4,5,5a,8,8a - octahydro - 5,8 - methano - 2,3-naphthalenedicarboxylic acid which may also be designated as N-(aminophenylaminophenyl)-5,6,7,8,9,9-hexachloro-1,2,3,4,5,5a,8,8a - octahydro - 5,8-methano-2,3-naphthalenedicarboxylic acid imide.

Example VI

In this example the mixture of 123 grams (1.0 mole) of 1,2,4-triaminobenzene and 150 cc. of benzene is placed in a reaction flask of a nature similar to that utilized in the above examples. Following this 85 grams (0.2 mole) of 5,6,7,8,9,9 - hexachloro-1,2,3,4,5,5a,8,8a-octahydro-5,8-methano-2,3-naphthalenedicarboxylic anhydride is gradually added thereto during a period of about 15 minutes. The flask is then heated to a temperature of about 85° C. and maintained thereat for a period of about 4 hours during which time the theoretical amount of water formed during the reaction is removed. At the end of this time the flask and contents thereof are cooled to room temperature following which the solvent and excess amine compound are removed in a manner similar to that hereinbefore set forth. There is recovered by conventional means the desired product comprising the phenyldiamino imide of 5,6,7,8,9,9-hexachloro-1,2,3,4,5,5a,8,8a-octahydro-5,8-methano-2,3-naphthalenedicarboxylic acid which may also be designated as N - (diaminophenyl) - 5,6,7,8,9,9 - hexachloro - 1,2,3,4,5,5a,8,8a - octahydro - 5,8 - methano - 2,3-naphthalenedicarboxylic acid imide.

Example VII

This example illustrates the use of an imide of 5,6,7,8,9,9 - hexachloro-1,2,3,4,5,5a,8,8a-octahydro-5,8-methano-2,3-naphthalenedicarboxylic acid as a curing agent for resinous materials. A liquid epoxy resin having an epoxide equivalent weight of 190 and known in the trade as "Epon 828" was used as the resin. A mixture comprising 170 grams of the diethylenediamino imide of 5,6,7,8,9,9-hexachloro - 1,2,3,4,5,5a,8,8a-octahydro-5,8-methano-2,3-naphthalenedicarboxylic acid and 190 grams of epoxy resin was warmed on a steam bath. After several minutes the mixture became homogeneous and was poured into molds which had been prepared from glass sheets and Teflon spacers. In addition, a mold release agent was also used to facilitate removal. The molds were placed in an air circulating oven and the curing of the resin took place at 100° C. for a period of about 6 hours. By utilizing various widths of spacers, ⅛″ and ¼″ sheets of resin were prepared. The sheets were cut into ½″ and 1″ strips which were used for evaluation of the resin. It was found that the epoxy resin which had been cured by the addition of the diethylenediamino imide of 5,6,7,8,9,9-hexachloro - 1,2,3,4,5,5a,8,8a-octahydro-5,8-methano-2,3-naphthalenedicarboxylic acid had the following properties:

Heat distortion temperature
  (ASTM D648) _____ 264 p.s.i. at 85° C.
Hardness (Shore durometer,
  type D) _____ 89.

In addition to the aforementioned properties of the cured epoxy resin, the resin, due to the presence of the particular imide, was self-extinguishing when removed from the direct action of a flame.

Example VIII

In this example the tetraethylenetetramino imide of 5,6,7,8,9,9 - hexachloro-1,2,3,4,5,5a,8,8a-octahydro-5,8-methano-2,3-naphthalenedicarboxylic acid which was prepared according to the process set forth in Example III is used to cure an epoxy resin. A mixture of 190 grams of a liquid epoxy resin having an epoxide equivalent weight of 190 and known in the trade as "Epon 828" and 120 grams of the tetraethylenetetramino imide of 5,6,7,8,9,9-hexachloro - 1,2,3,4,5,5a,8,8a-octahydro-5,8-methano-2,3-naphthalenedicarboxylic acid is warmed on a steam bath. When the mixture has become homogeneous it is poured into molds which are prepared from glass sheets and Teflon spacers. The resin is cured in an air circulating oven at a temperature of about 100° C. for a period of 6 hours. The sheets which have been cured are removed and tested in a manner similar to that set forth in Example VII above, the strips showing similar properties of heat distortion and hardness as well as being self-extinguishing when removed from the direct action of a flame.

Example IX

In this example a mixture of 138 grams of the triethylenetriamino imide of 5,6,7,8,9,9-hexachloro-1,2,3,4,5,5a,8,8a - octahydro - 5,8-methano-2,3-naphthalenedicarboxylic acid and 190 grams of a liquid epoxy resin is warmed in a steam bath and after the mixture has become homogeneous, it is poured into molds of a similar nature to that set forth in Examples VII and VIII. The mixture is cured in an air circulating oven at a temperature of 180° C. for a period of 6 hours. At the end of this time the sheets of resin which have been prepared are cut into strips and subjected to physical property evaluation. The physical properties of this resin are similar in nature to that found in the above examples as to heat distortion and hardness and in addition the strip of resin is self-extinguishing when removed from a direct action of a flame.

I claim as my invention:

1. An imide of the following general formula:

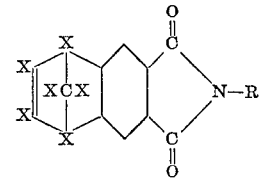

in which R is selected from the group consisting of hydrogen, alkyl and aminoalkyl of from 1 to 20 carbon atoms, polyalkenepolyamino, aryl, aminoaryl, polyarylenepolyamino of from 1 to 3 carbocyclic rings and aminocycloalkyl and polycycloalkenepolyamino having from 4 to 8 carbon atoms in the ring, and X is selected from the group consisting of hydrogen and halogen radicals, at least two X's being halogen.

2. N - (aminoethylaminoethyl) 5,6,7,8,9-hexachloro-1,2,3,4,5,5a,8,8a - octahydro-5,8-methano-2,3-naphthalenedicarboxylic acid imide.

3. N - (aminoethyl) 5,6,7,8,9,9-hexachloro-1,2,3,4,5,5a,8,8a - octahydro-5,8-methano-2,3-naphthalenedicarboxylic acid imide.

4. N - (aminophenylaminophenyl) 5,6,7,8,9,9 - hexachloro - 1,2,3,4,5,5a,8,8a-octahydro-5,8-methano-2,3-naphthalenedicarboxylic acid imide.

5. N - (diaminophenyl) 5,6,7,8,9,9-hexachloro-1,2,3,4,5,5a,8,8a - octahydro - 5,8-methano-2,3-naphthalenedicarboxylic acid imide.

6. N - (aminoethylaminoethylaminoethylaminoethyl) 5,6,7,8,9,9 - hexachloro - 1,2,3,4,5,5a,8,8a-octahydro-5,8-methano-2,3-naphthalenedicarboxylic acid imide.

7. An imide as defined in claim 1 further characterized in that R in said formula is aminoalkyl having from 2 to 8 carbon atoms.

8. An imide as defined in claim 1 further characterized in that R in said formula is polyarylenepolyamino of from 1 to 3 carbocyclic rings.

References Cited by the Examiner
UNITED STATES PATENTS

| | | | |
|---|---|---|---|
| 2,795,589 | 6/1957 | Bluestone | 260—326 |
| 3,064,006 | 11/1962 | Novello | 260—326 |
| 3,135,706 | 6/1964 | Vandenberg | 260—2 |
| 3,144,417 | 8/1964 | Bailey et al. | 260—2 |

ALEX MAZEL, *Primary Examiner.*

JOSEPH A. NARCAVAGE, *Assistant Examiner.*